United States Patent Office 3,375,414
Patented Mar. 26, 1968

3,375,414
CAPACITOR WITH SODIUM FORMATE ELECTROLYTE
Charles E. Welch, Jr., Williamstown, Mass., assignor to Sprague Electric Company, North Adams, Mass., a corporation of Massachusetts
No Drawing. Filed Oct. 8, 1965, Ser. No. 494,256
3 Claims. (Cl. 317—230)

ABSTRACT OF THE DISCLOSURE

An electrolytic capacitor wherein the electrolyte is sodium formate dissolved in 5–70% by weight ethylene glycol monomethyl ester and 30–95% by weight a comparible electrolyte solvent.

---

This invention relates to electrolytic capacitors and more particularly to an electrolyte for such capacitors.

A persistent problem associated with electrolytic capacitors is internal corrosion, usually localized on the anode tabs in the area where they emerge from the capacitor section. Once corrosion has begun, it is generally merely a matter of time before the unit fails due to severance of at least one electrode tab. Another and possibly cause-related problem is electrolyte leakage out of the seal end of the capacitor.

The conditions which cause the corrosion and leakage are not fully understood. In any given production run, some units will show corrosion and some will be devoid of corrosion. No satisfactory explanation accounts for why these units, believed to be identical in every respect, should be affected differently under the same conditions.

A principal object of the invention is to provide a capacitor having an electrolyte which provides a far less corrosive environment for the internal members of the capacitor than prior art electrolytes.

Another object of the invention is to provide a capacitor not subject to destructive internal gassing.

A further object is to present a capacitor having non-corrosive and nongassing properties without sacrificing other desirable characteristics.

Yet another object is to present a capacitor having excellent low temperature properties.

These and other objects and advantages of the present invention will be made obvious to those skilled in the art by the following description.

The foregoing objects are attained by incorporating in a capacitor comprising a first oxide coated electrode and a second electrode spaced therefrom, an anhydrous electrolyte consisting essentially of sodium formate dissolved in from about 5–70% by weight ethylene glycol monomethyl ether and from 30–95% by weight of a compatible electrolyte solvent. The sodium formate can be present in any proportion up to about 10% by weight, preferably from about 1–7% by weight.

In order to point out more fully the nature of the present invention the following comparative specific examples are given below.

EXAMPLE I 45 aluminum foil capacitors, rated at 16 volts, were impregnated with an electrolyte of the following constitution:

| | Parts by weight |
|---|---|
| Ethylene glycol monomethyl ether | 47.5 |
| Ethylene glycol | 47.5 |
| Sodium formate | 5 |

The units were then nonhermetically sealed in aluminum metal cans. The end seal is a resilient phenolic material held in place by spinning over the end of the can. After recording the capacitance and the resistance times capacitance (R×C), the units were inverted in an oven at 85° C. and placed under rated voltage for a period of 1000 hours.

After 1000 hours the units were examined and there was no evidence of electrolyte leakage from any of the 45 units.

There was an average decrease in capacitance after 1000 hours of only 3%. At 0 hours the average R×C of the units was 80 and after 1000 hours it was 103. This data reveals no significant change in capacitance and no significant change in R×C over 1000 hours for commercial quality capacitors.

These units were dissected and examined for evidence of corrosion, particularly in the anode tab area. No evidence of corrosion was found anywhere in these units. These units were analyzed for water content and were found to contain less than 1% $H_2O$.

EXAMPLE II 48 capacitors of the same type employed in Example I were impregnated with an electrolyte consisting of:

| | Parts by weight |
|---|---|
| Ethylene glycol monomethyl ether | 47.5 |
| Ethylene glycol | 47.5 |
| Ammonium formate | 4.0 |

As in the preceding example the units were nonhermetically sealed in aluminum metal cans. After recording the capacitance and the R×C data, the units were inverted in an oven at 85° C. and placed under rated voltage for a period of 1000 hours. These conditions were the same as those of Example I.

After 1000 hours the units were examined for electrolyte leakage. Out of the 48 units 37 showed varying degrees of leakage. This indicated a gassing condition developed within the capaictors and pressure forced the electrolyte out the sealed end.

The units were again measured for capacitance and there was found to be an average 4% increase in capacitance. An increase in capacitance, under the conditions recited, is far worse than a comparable average decrease, because it is an indication of dielectric oxide dissolution.

At 0 hours the R×C average of the units was 89 and after 1000 hours it was 118. This does not constitute a significant change.

Each unit was dissected to observe the presence or absence of corrosion. In 24 of the 48 units the degree of corrosion ranged from slight to severe and in each case the corrosion was localized at the area where the anode tabs emerge from the section.

Analysis of the electrolyte after the 1000 hours revealed a water content of from 3–5%.

It will be noted that there is a weight difference between the solute in Example I and the solute in Example II. These weights were selected so as to result in resistivities which were approximately equal for the purposes of a valid comparison.

EXAMPLE III

A series of forty five 500 μf., 16 volt aluminum foil capacitor sections were impregnated with the electrolyte of Example I. The average capacitance decrease at low temperatures as compared with capacitance at 25° C. was determined. Also the ESR (equivalent series resistance) at low temperature was determined. The results are compared below with those determined for a series of prior art units.

EXAMPLE IV

A series of forty five 400 μf., 16 volt aluminum foil capacitance sections were impregnated with a commercial ethylene glycol-ammonium borate electrolyte. The same measurements as those obtained in Example III were taken and the results as compared with Example III are as follows:

|  | −30° C. | −40° C. |
|---|---|---|
| Example III—Ave. Cap. decrease, percent | 11.2 | 19.3 |
| ESR, ohms | 1.18 | 2.88 |
| Example IV—Ave. Cap. decrease, percent | 40.8 | 61.0 |
| ESR, ohms | 9.41 | 30.0 |

As can be seen the average capacitance decrease is considerably greater for the glycol-borate capacitor. Moreover, the equivalent series resistance of the units of the present invention is far more stable and lower than the prior art units.

The term compatible electrolyte solvent includes any solvent which is either miscible with ethylene glycol monomethyl ether or very soluble therein. Examples of suitable compatible solvents are: dimethyl formamide, propylene carbonate, gamma butyrolactone, ethylene glycol, diethylene glycol, etc.

While the specific examples herein show the use of equal parts of methyl Cellosolve, i.e. ethylene glycol monomethyl ether, and the compatible solvent, it is to be understood that this is merely representative of the broader range of proportions defined above. Electrolyte formulations having 14% methyl Cellosolve and 86% ethylene glycol, with sodium formate as the solute, have also exhibited dramatic characteristics. Even the lower limit of 5% methyl Cellosolve with sodium formate in an anhydrous system shows improved characteristics. At the upper end of the range, i.e., above 70% ethylene glycol monomethyl ether, this solvent tends to volatilize above 125° C. and escape from nonhermetically sealed units.

The compositions disclosed herein have resistivities within the desired range of 210 to 230 ohm centimeters at 25° C. Capaictors incorporating these electrolytes have relatively low power factors which they retain for extended periods of time. Furthermore, such capacitors are useful over an exceptionally wide temperature range.

It is to be understood that for the purposes of the present invention the term "anhydrous" includes a system having less than 1% water.

While the present invention has been described with respect to aluminum electrolytic capacitors, where anhydrous conditions are deemed essential, it is to be understood that the present electrolyte system has utility in other capacitors e.g., tantalum, where anhydrous conditions need not prevail.

Since it is obvious that many changes and modifications can be made in the above described details without departing from the nature and spirit of the invention it is to be understood that the invention is not limited to said details except as set forth in the appended claims.

What is claimed is:

1. An electrolytic capacitor comprising a first oxide coated electrode, a second electrode spaced therefrom and an electrolyte in contact with said electrodes, said electrolyte consisting essentially of sodium formate dissolved in from about 5–70% by weight ethylene glycol monomethyl ether and from 30–95% by weight of a compatible electrolyte solvent, said formate being up to 10% by weight of said electrolyte.

2. An electrolytic capacitor comprising a first oxide coated aluminum electrode, a second aluminum electrode spaced from said first electrode and an anhydrous electrolyte in contact with said electrodes, said electrolyte consisting essentially of sodium formate dissolved in from about 5–70% by weight ethylene glycol monomethyl ether and from 30% to 95% by weight of a compatible electrolyte solvent, said formate being up to 10% by weight of said electrolyte.

3. The capacitor of claim 2 wherein the electrolyte consists essentially of up to 10% by weight sodium formate dissolved in a combination of about equal parts of ethylene glycol monomethyl ether and ethylene glycol.

References Cited
UNITED STATES PATENTS 3,138,746  6/1964  Burger et al. _____ 317—230

JAMES D. KALLAM, *Primary Examiner.*

UNITED STATES PATENT OFFICE
CERTIFICATE OF CORRECTION

Patent No. 3,375,414      Dated March 26, 1968

Inventor(s) Charles E. Welch, Jr.

It is certified that error appears in the above-identified patent and that said Letters Patent are hereby corrected as shown below:

Column 1, line 14, "ester" should read -- ether -- ; and "comparible" should read -- compatible --

Signed and sealed this 18th day of May 1971.

(SEAL)
Attest:

EDWARD M. FLETCHER, JR.       WILLIAM E. SCHUYLER, JR.
Attesting Officer      Commissioner of Patents